H. KLECKLER.
ENGINE BED MOUNTING.
APPLICATION FILED MAY 31, 1918.

1,290,237.

Patented Jan. 7, 1919.
2 SHEETS—SHEET 1.

Inventor
HENRY KLECKLER.

By Attorney

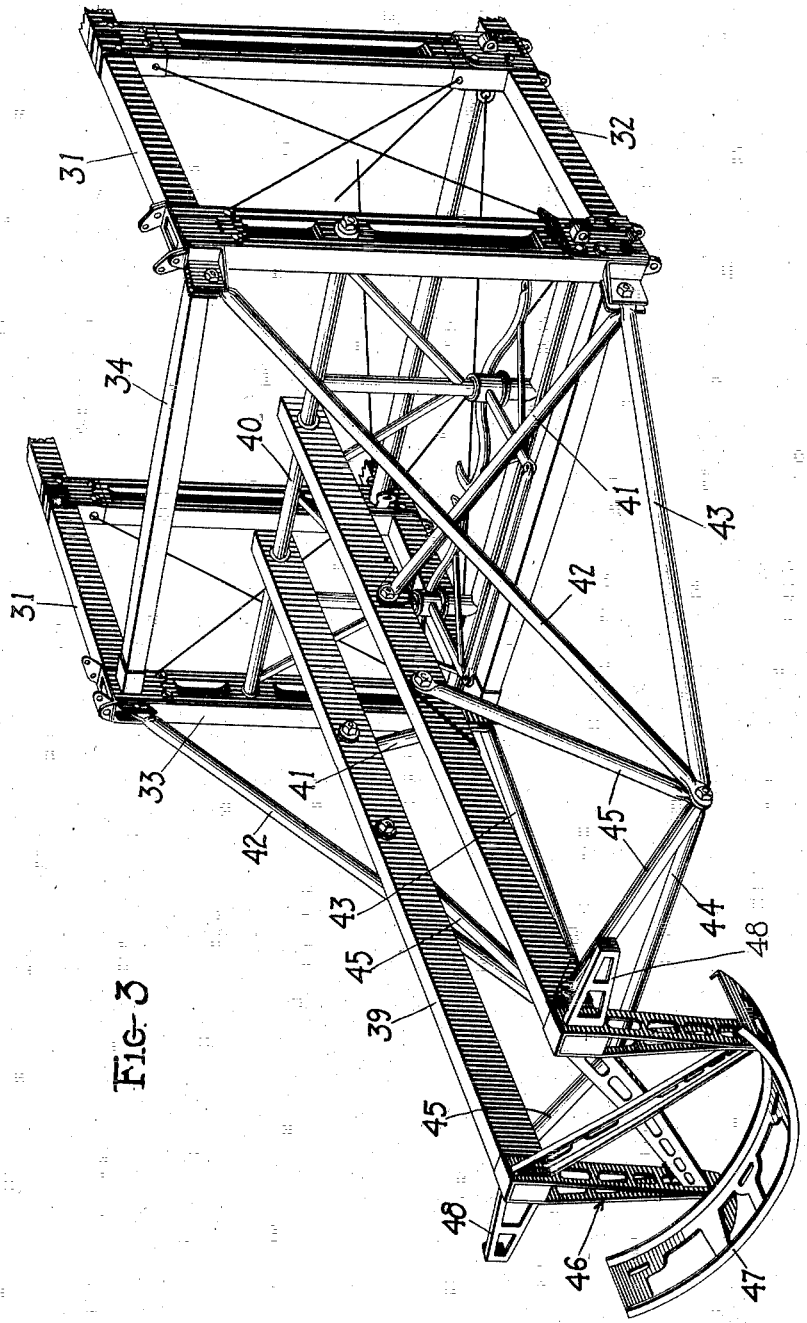

UNITED STATES PATENT OFFICE.

HENRY KLECKLER, OF HEMPSTEAD, NEW YORK, ASSIGNOR TO CURTISS AEROPLANE AND MOTOR CORPORATION, A CORPORATION OF NEW YORK.

ENGINE-BED MOUNTING.

1,290,237.

Specification of Letters Patent.

Patented Jan. 7, 1919.

Original application filed February 8, 1917, Serial No. 147,414. Divided and this application filed May 31, 1918. Serial No. 237,436.

*To all whom it may concern:*

Be it known that I, HENRY KLECKLER, a citizen of the United States, residing at Hempstead, in the county of Nassau and State of New York, have invented certain new and useful Improvements in Engine-Bed Mountings, of which the following is a specification.

My invention relates to airplane fuselages and more particularly to improvements in engine bed mountings as applied to airplanes of the land and hydro types. As pointed out in application Serial No. 147,414 filed Feb. 8, 1917, of which this application is a division, the engine bed is mounted at the extreme forward end of the fuselage. The mounting consists, in so far as possible, of a plurality of V-arranged braces symmetrically disposed at opposite sides of the fore and aft axis of the fuselage. Two of the total number of V-braces are horizontally disposed. These braces constitute forward continuations of the fuselage longerons and are so arranged relatively to the engine bed that the apices thereof lie beneath and intermediate the ends of the engine bed. The vertical V-braces are carried at the forward extremities or apices of the horizontal V-braces and directly support the engine bed from beneath. This arrangement puts the lower members of the horizontal V-braces under compression and the upper members under tension while both members of the vertical V-braces are under direct compression stress. By connecting the members of the horizontal V-braces to the longerons of the fuselage the weight mass of the motor is distributed over the full area thereof as the longerons themselves constitute the skeleton framework of the fuselage.

In other words, the vertical V-braces, which directly support the motor or engine bed are in turn supported by a substantial cantaliver truss. Moreover, for added strength, additional bracing is provided at the rear end of the engine bed that the thrust effort of the tractor propeller (not shown) may be effectually carried into the fuselage other than by way of the horizontal V-braces which constitute the cantaliver truss.

Of the drawings:

Fig. 3 is a perspective view of the engine bed, its mounting and that portion of the fuselage in the immediate vicinity thereof.

Figure 1:
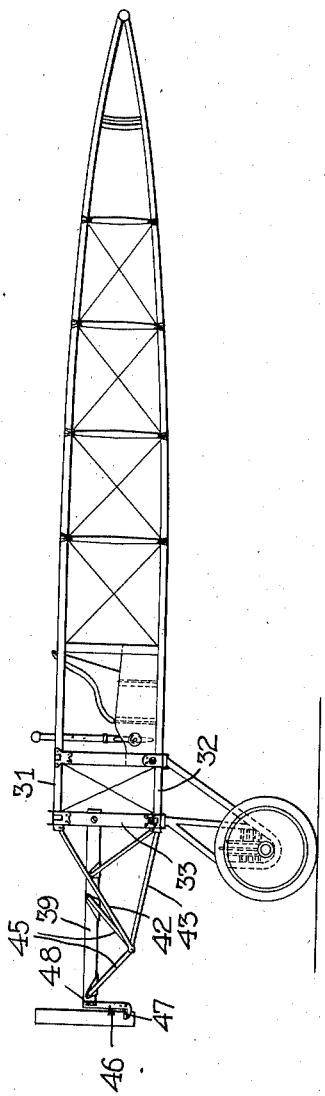
Figure 1 is a side elevation of the fuselage assembly.
Figure 2:
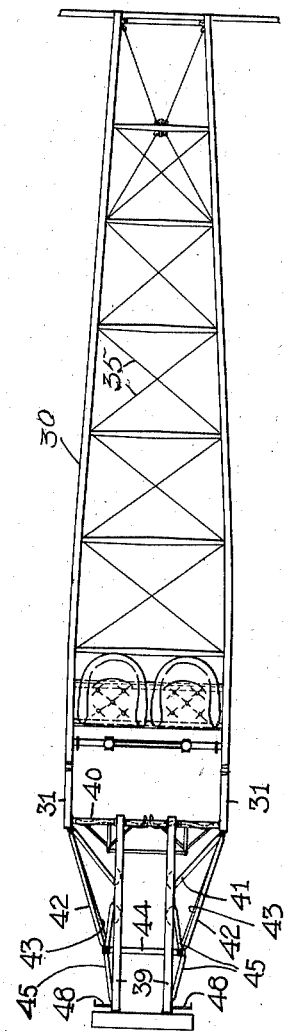
Fig. 2 is a top plan view.

The fuselage, designated in its entirety by the numeral 30, comprises the usual longerons 31 and 32, 31 designating the upper longerons and 32 the lower. Vertical and horizontal struts 33 and 34 together with cross arranged wires 35, interbrace the longerons and truss the fuselage throughout. From the forward end of the fuselage rearwardly the upper longerons 31 are bowed inwardly and downwardly and the lower longerons 32 inwardly and upwardly, the longerons at opposite sides of the fuselage intersecting at the tail end thereof. At said tail end the longerons are interconnected by a horizontal extending stern post 36.

Fuselage posts 37 and 38 interconnect the longerons vertically and define what I shall hereinafter designate the engine section although the motor in reality is located ahead of said posts. Said section constitutes that portion of the craft within the limits of which the centers of gravity and resistance are contained.

The longerons 31 and 32 forwardly terminate at a point rearwardly removed from the nose end of the fuselage, that portion of the fuselage continuing the longerons forwardly constituting the engine bed mounting (see Fig. 3). The engine bed comprises the usual engine bed beams 39. A cross brace 40 penetrates the beams 39 in the plane of the fuselage posts 37, the terminals of said brace passing through said posts for securement. At a point somewhat in advance of the brace 40, braces 41 are inclined forwardly and inwardly from the lower longerons 32 to engage and support the engine bed in the vicinity of its mid section, one of said braces engaging each of the respective engine bed beams. Converging braces 42 and 43 (converging both in a horizontal and in a vertical plane) continue respectively the longerons 31 and 32 forwardly beyond said engine section for termination in a plane below the horizontal plane of the engine bed. The braces 42 and 43 at each side of the fuselage are interconnected by a cross brace 44.

As a further support for the engine bed, braces 45 diverge upwardly from the terminals of the cross brace 44, the forward brace of each pair of diverging braces engaging the engine bed at its extreme forward end and the rear brace of each pair engaging said bed in the vicinity of its mid section. Thus there is provided a four point support for the engine bed, the points of support lying two at the mid section and one at each end.

The braces 42 and 43 on opposite sides of the fuselage together constitute substantially V-braces horizontally disposed while the braces 45, similarly arranged, together constitute substantially V-braces vertically arranged. The apices of the horizontally disposed V-braces and the apices of the vertical V-braces coincide. This arrangement puts the braces 42 under tension and the braces 43 under compression stress and since these braces directly connect with the several longerons of the fuselage it is evident that the total stress set up in consequence of the weight mass of the motor is effectually carried into and distributed over substantially the entire area of the fuselage. The horizontally disposed V-braces, in other words, constitute in effect, a substantially cantaliver truss which is designed to withstand substantially the entire weight of the motor. The braces 41 and the cross brace 40 (more particularly the latter) carry only a very small portion of the total load.

The radiator bracket 46 is hung from the engine bed at its extreme forward end. In addition to a supporting flange 47 it is equipped with arms 48 which laterally brace the radiator (not shown). The weight of the radiator is thus likewise carried by the engine bed beams and indirectly by the fuselage, the braces 45, 42 and 43 constituting means whereby the stresses caused by the weight mass of the radiator are also effectually carried into the fuselage. The mounting for the engine bed however is that which I shall hereinafter claim.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:

1. In an airplane, a body, longerons terminating forwardly aft of the forward end of said body, converging braces continuing said longerons forwardly, an engine bed, and diverging braces upwardly extended from the forward end of said continuing braces to support said engine bed.

2. In an airplane, a body, longerons terminating forwardly aft of the forward end of said body, forwardly converging braces continuing said longerons in pairs, a connection between the respective pairs of braces at their forward end, an engine bed forwardly extended beyond the plane of said connection, and braces upwardly extending from said point of connection to engage and support the engine bed.

3. In an airplane, a fuselage comprising longerons, converging braces forwardly continuing said longerons, an engine bed, upwardly diverging braces mounted at the forward end of said continuing braces to engage and support the engine bed at its forward end, and means engaging and supporting the engine bed aft of said forward supporting means.

4. In an airplane, a fuselage comprising longerons, an engine bed forwardly extended considerably beyond said longerons, converging braces continuing said longerons to a point in a plane beneath said engine bed and aft of its forward end, a connection between said continuing braces and said forwardly extended end of the engine bed, and a direct connection between the engine bed and the longerons.

5. In an airplane fuselage, longerons terminating short of the forward end of the fuselage, an engine bed, horizontal V-braces arranged respectively at opposite sides of the engine bed substantially in continuation of the longerons and vertical V-braces mounted respectively at the apices of the horizontal V-braces to support the engine bed from beneath.

6. In an airplane fuselage, longerons terminating short of the forward end of the fuselage, an engine bed, horizontal forwardly converging V-braces arranged respectively at opposite sides of the engine bed substantially in continuation of the longerons at opposite sides of the fuselage, vertical V-braces mounted respectively at the apices of the horizontal V-braces, the apices of the vertical V-braces and the apices of the horizontal V-braces coinciding, said vertical V-braces constituting a support for the engine bed from beneath, and means engaging beneath the engine bed at a point rearwardly removed from the vertical V-braces to effectually support it at or near its rear end.

7. An engine bed mounting for airplanes comprising opposed horizontal V-braces having their apices extended forwardly and beneath the horizontal plane of the engine bed together with vertical V-braces mounted respectively at the apices of the horizontal V-braces, the vertical V-braces engaging the engine bed from beneath.

8. An engine bed mounting for airplanes comprising horizontal V-braces and vertical V-braces, the one being carried by the other, said braces being so arranged relatively to the engine bed that but one species directly engages therewith while the other is directly attached to the fuselage, together with means cross arranged between the V-braces at opposite sides of the engine bed to rigidly unite them, said cross brace engaging the total number of V-braces at their respective apieces.

In testimony whereof I hereunto affix my signature.

HENRY KLECKLER.